United States Patent
Kapoor

(10) Patent No.: US 11,383,551 B2
(45) Date of Patent: Jul. 12, 2022

(54) SURFACE SHIELD FOR AN UNDERLYING OBJECT

(71) Applicants: Saurabh Kapoor, Delhi (IN); Gaurav Kapoor, Delhi (IN); Simar Kapoor, Delhi (IN)

(72) Inventor: Simar Kapoor, Delhi (IN)

(*) Notice: Subject to any disclaimer, the term of this patent is extended or adjusted under 35 U.S.C. 154(b) by 300 days.

(21) Appl. No.: 16/158,134

(22) Filed: Oct. 11, 2018

(65) Prior Publication Data
US 2019/0291508 A1 Sep. 26, 2019

(30) Foreign Application Priority Data
Mar. 23, 2018 (IN) .............................. 201811010733

(51) Int. Cl.
*B60B 7/01* (2006.01)
(52) U.S. Cl.
CPC ...................................... *B60B 7/01* (2013.01)
(58) Field of Classification Search
CPC .. B60B 7/01; B60B 7/04; B60B 7/063; B60B 7/08; B60B 7/10; B60B 7/105; B60B 7/065; B60Y 2410/113
See application file for complete search history.

(56) References Cited

U.S. PATENT DOCUMENTS

| 4,895,414 A | * | 1/1990 | Fleming | B60B 7/10 301/37.109 |
| 8,147,004 B2 | * | 4/2012 | Milicevic | B60B 7/01 301/37.24 |
| 2014/0167490 A1 | * | 6/2014 | Roh | B60B 7/01 301/37.24 |

FOREIGN PATENT DOCUMENTS

| CN | 102485577 A | * | 6/2012 | |
| CN | 106671693 A | * | 5/2017 | B60B 7/063 |
| KR | 101444913 B1 | * | 9/2014 | B60B 7/105 |

* cited by examiner

*Primary Examiner* — Kip T Kotter
*Assistant Examiner* — Emily G. Castonguay
(74) *Attorney, Agent, or Firm* — Kunzler Bean & Adamson, PC

(57) ABSTRACT

A surface shield for an underlying object is disclosed. The surface shield includes a first structure. The first structure has an inner surface and an outer surface. The outer surface includes a plurality of slots. The inner surface is in contact with an underlying surface to be protected. The first structure includes one of a single-part structure or a multi-part structure. The surface shield includes a plurality of clamps removably coupled to the slots of the first structure. Each clamp is coupled to a corresponding slot of the first structure.

7 Claims, 4 Drawing Sheets

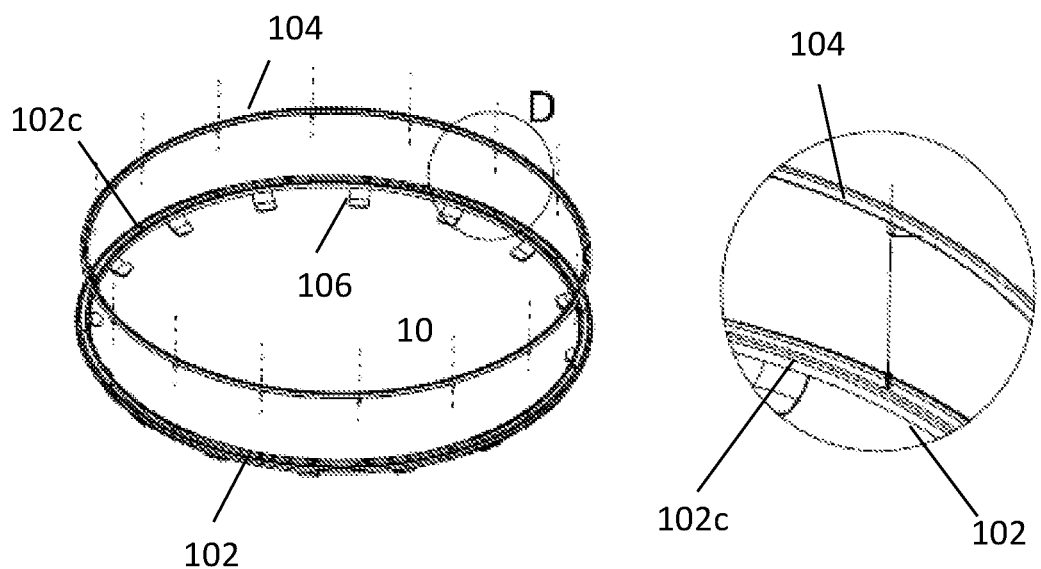
FIG. 2
FIG. 2a
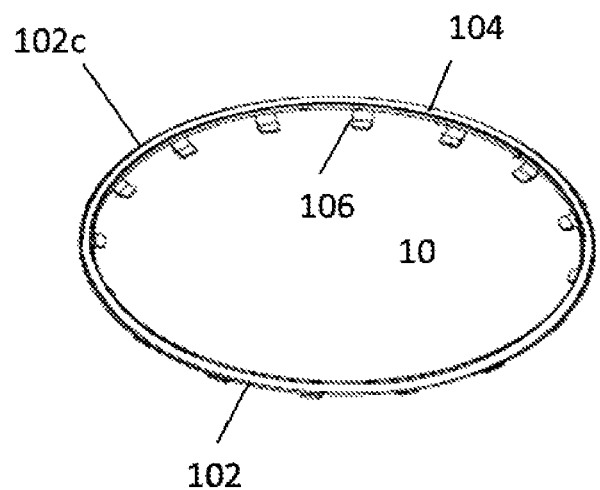
FIG. 2b

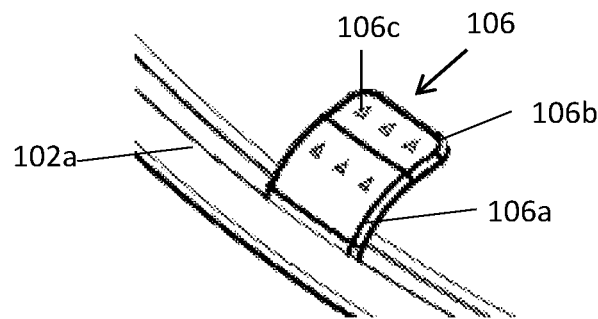
FIG. 4
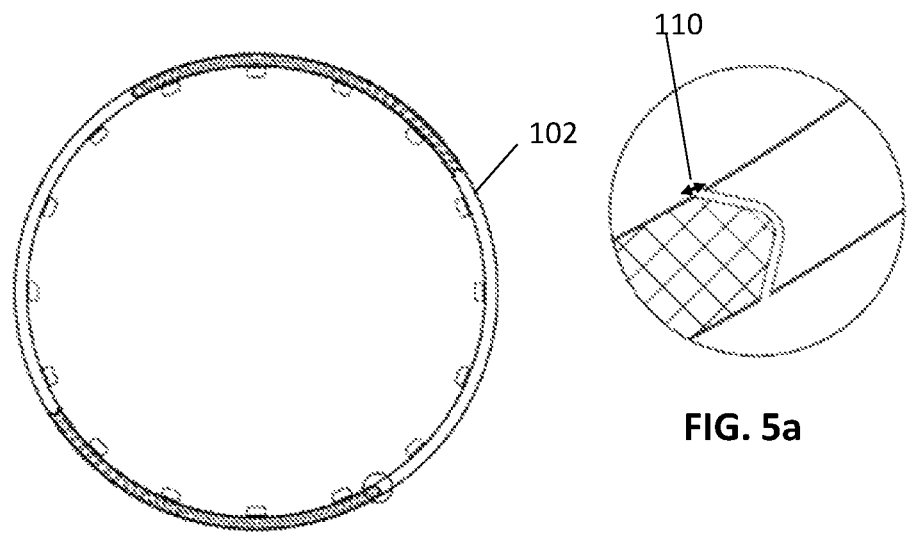
FIG. 5
FIG. 5a

SURFACE SHIELD FOR AN UNDERLYING OBJECT

CROSS-REFERENCE TO RELATED APPLICATION

This application claims priority to Indian Patent Application Number 201811010733 entitled "SURFACE SHIELD FOR AN UNDERLYING OBJECT" and filed on Mar. 23, 2018 for Simar Kapoor, which is incorporated herein by reference.

FIELD OF INVENTION

The present invention relates to a surface shield for protecting an underlying surface. More specifically, the present invention relates to a surface shield which is removably coupled to the underlying surface of an underlying object.

BACKGROUND

With the evolution of automobile industry, varied high-end automobile parts and/or accessories have been devised. Such automobile parts and/or accessories mostly utilize alloyed surfaces. The automobile parts and/or accessories with alloyed surfaces not only enhance strength and durability of the vehicle but also increase its aesthetic appeal. However, such alloys are prone to wear and tear, rusting/corrosion, etc. and therefore are required to be protected.

One such example of the above are alloy wheels which are utilized in high-end sports cars, luxury vehicles and even few budget cars. The alloy wheels offer various advantages such as better looks, better heat conduction, better fuel economy, lesser likelihood of rusting/corrosion, etc. However, they have certain limitations. Many modern day alloy wheels have very large diameters which makes their rims susceptible to damage. Moreover, alloy wheels can easily pick up scratches and scrapes from road kerbs which spoil their appearance.

In order to protect the alloy wheels from damage, various solutions have been devised. Wheel rim protectors are one such solution to the aforesaid problem. The wheel rim protector may be in the form of a strip of flexible, tough plastic or rubber material that fits around the periphery of the rims of alloy wheels. Conventional wheel rim protectors are self-adhesive and stick over the edge of the wheel, while others are applied with appropriate adhesives. However, such wheel rim protectors chip off as the effectiveness of the adhesive declines.

Therefore, a shield which overcomes the disadvantages of the present state of art and provides a sustainable solution is required to be developed.

SUMMARY

The present invention discloses a surface shield for an underlying object. The surface shield includes a first structure. The first structure has an inner surface and an outer surface. The outer surface includes a plurality of slots. The inner surface is in contact with an underlying surface to be protected. The first structure includes one of a single-part structure or a multi-part structure. The surface shield includes a plurality of clamps removably coupled to the slots of the first structure. Each clamp is coupled to a corresponding slot of the first structure.

BRIEF DESCRIPTION OF DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the disclosure is not limited to specific methods and instrumentalities disclosed herein. Moreover, those in the art will understand that the drawings are not to scale. Wherever possible, like elements have been indicated by identical numbers.

FIGS. 2, 2a, & 2b illustrate an embodiment of the surface shield 100 of FIGS. 1a/1b in accordance with an embodiment of the present invention.

FIG. 4 shows a magnified view of the clamp of FIG. 2 in accordance with an embodiment of the present invention.

FIGS. 5 & 5a show an embodiment of first structure 102 of surface shield in accordance with an embodiment of the present invention.

DETAILED DESCRIPTION OF DRAWINGS

Figure 1A:
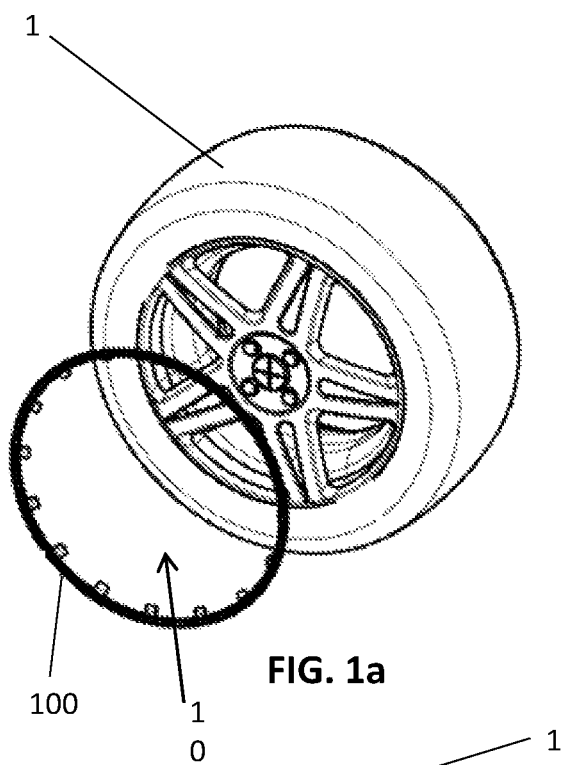
FIGS. 1a & 1b illustrate a surface shield for protecting wheel rim in accordance with an embodiment of the present invention.

Prior to describing the invention in detail, definitions of certain words or phrases used throughout this patent document will be defined: the terms "include" and "comprise", as well as derivatives thereof, mean inclusion without limitation; the term "or" is inclusive, meaning and/or; the phrases "coupled with" and "associated therewith", as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; Definitions of certain words and phrases are provided throughout this patent document, and those of ordinary skill in the art will understand that such definitions apply in many, if not most, instances to prior as well as future uses of such defined words and phrases.

Wherever possible, same reference numbers will be used throughout the drawings to refer to same or like parts. Moreover, references to various elements described herein are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Particular embodiments of the present disclosure are described herein below with reference to the accompanying drawings, however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The present invention discloses a surface shield. The surface shield may be utilized with an underlying object. The underlying object may be any object having an alloyed surface (or a metallic surface) utilized in, without limitation, automobile industry. In an embodiment, the surface shield is utilized with a wheel of a vehicle. The surface shield of the present invention aims to overcome the limitations of conventional systems. The surface shield may be detachably coupled to an underlying surface of the underlying object for example, a rim of the wheel without requirement of an adhesive. Moreover, the surface shield of the present invention offers a cost effective solution to protect a metallic surface for example, a rim of a wheel from damage. The surface shield may also cover any existing damage visible on the metallic surface.

In an embodiment, the surface shield includes without limitation one or more loop structures and a plurality of clamps coupled to at least one loop structure. In various embodiments, the clamps may be removably coupled or an integral part of the surface shield.

Additionally or optionally, the loop structures may be a one-part structure or a multi-part structure.

Additionally or optionally, the surface shield is a multiple loop structure, for example a dual loop structure with a first and a second structures. The multiple loop structure enhances the strength of the surface shield. In an alternate embodiment, the surface shield is a single loop structure.

The invention will now be described in detail in the context of wheels. However, it is to be noted that the teachings of the present invention are applicable to metallic surfaces that are to be protected from rusting/corrosion, wear and tear, etc. as stated above.

Figure 1B:
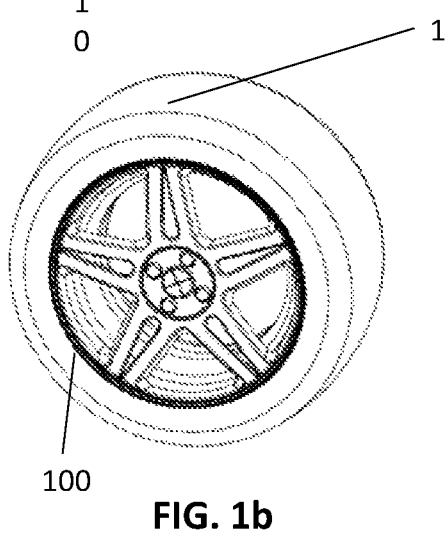

Now turning to figures, FIGS. 1a and 1b depict a wheel 1 before and after being assembled with the surface shield 100 respectively. The surface shield 100 when mounted on wheel 1 does not disturb the distribution of mass within the wheel 1 (including the rim) to which it is attached thus securing wheel balance.

The surface shield 100 may be made of any durable material known in the art. The materials may include without limitation, any metal or polymer or combination thereof. The metals may include, without limitation, aluminum, steel, etc. The polymers may include, without limitation, ABS (acrylonitrile butadiene styrene), PVC (polyvinyl chloride), acetal, acrylic, nylon, phenylene oxide, polycarbonate, polyester, polyethylene, polypropylene, polysulfone, styrene, urethane, and vinyl plastics. In case the surface shield 100 is made of a metal, it may be coated with a solution to prevent rusting or corrosion. The solution may include, without limitation, fluoropolymer based solutions, phosphate based solutions, epoxy based coatings, etc. Optionally/additionally, the surface shield 100 may be coated with a solution in order to increase the strength of the material.

The surface shield 100 may have any dimension and color known in the art such as without limitation, black, green, yellow, etc. In an embodiment, the surface shield 100 is a multi-colored assembly. The shape of the surface shield 100 corresponds to the shape of the underlying surface. For example, in the context of FIGS. 1a/1b, the surface shield 100 is a loop-shaped structure.

As represented in FIG. 2, the surface shield 100 may include one or more sub-components without limitation a first structure 102, a plurality of clamps 106 and optionally, a second structure 104.

The first structure 102 may include a circular body enclosing a cavity 10. The first structure 102 has an inner circumference and an outer circumference. Both the inner circumference and the outer circumference have an inner and an outer diameter respectively. In context of the wheel 1, the selection of the inner and/or outer diameter of the first structure 102 is dependent upon the rim diameter. However, in case the first structure 102 is to be designed for an underlying surface having a different shape, the shape of the first structure 102 would correspond to the same.

The first structure 102 may be manufactured as a single structure. Alternately, the first structure 102 may be manufactured as an assembly of multiple portions which when mounted on a required surface form a continuous body. In an exemplary embodiment as shown in FIG. 5, the multiple portions include four arcs. The multiple portions as depicted in FIG. 5a are not connected to each other and are spaced apart from each other at a predefined distance 110. Though it is possible that the multiple portions are not interconnected, in accordance with an embodiment, two consecutive portions may be connected together by way of snap fitting to form the first structure 102. In case the first structure 102 is to be formed of multiple portions, the first structure 102 may be transported in an unassembled state thus significantly reducing chances of damage incurred during transportation of the surface shield 100 and loss of product quality.

The first structure 102 may be made of any durable material known in the art such as a metal or a polymer. The metals may include, without limitation, aluminum, steel, etc. The metals may include without limitation, steel, aluminum, etc. The polymers may include, without limitation, ABS (acrylonitrile butadiene styrene), PVC (polyvinyl chloride) acetal, acrylic, nylon, phenylene oxide, polycarbonate, polyester, polyethylene, polypropylene, polysulfone, styrene, urethane, and vinyl plastics.

The first structure 102 further includes an inner surface 102a and an outer surface 102b. The inner surface 102a of the first structure 102 is in direct contact with an underlying surface of the underlying object, for example, the rim of the wheel 1.

The outer surface 102b of first structure 102 may include a channel 102c to engage the optional second structure 104 of the surface shield 100. The channel 102c may be provided throughout the circumference of the first structure 102 at its outer surface 102b. Alternately, the channel 102c may be provided for a predefined portion of the circumference of the first structure 102 at its outer surface 102b. The channel 102c may be disposed anywhere on the outer surface 102b of the first structure 102. For example, the channel 102c is disposed at the center of the outer surface 102b of first structure 102. The dimensions of the channel 102c correspond to the dimensions of the second structure 104. The first structure 102 may include any other method of engagement for connecting the second structure 104.

The second structure 104 is provided within the channel 102c of the first structure 102. Although a single second structure 104 sitting in the channel 102c of the first structure 102 is depicted in FIGS. 2, 2a, & 2b, it is possible that a plurality of second structures 104 with each subsequent loop sitting within the channel 102c of previous loop is possible and such a structure is within the teachings of the present invention. Alternately, in case if the channel 102c in the first structure 102 is provided for a predefined circumference, the second structure 104 is sized to fit in the channel 102c accordingly.

In an embodiment, the second structure 104 of surface shield 100 may include features that are identical to the first structure 102. In an embodiment, the second structure 104 is circular in shape. However, the dimensions of the second structure 104 may be smaller than the first structure 102 in terms of its diameter. Alternately, the second structure may be in the form of a solid ring that sits in the channel 102c of the first structure 102. The material of the second structure 104 may be same or different from the first structure 102.

The second structure 104 may be detachably attached with the first structure 102 as depicted in FIG. 2a. Such attachment may be performed by any means known in the art such as heat seal, snap fit, etc. Any other engaging means for coupling the first and second structures 102, 104 may also be used.

The second structure 104 increases the strength of the surface shield 100 and thus, prevents formation of cracks in the body of the surface shield 100 due to tensile forces. Further, the second structure 104 acts as a protective layer to the first structure 102 by preventing scratches on the underlying surface for example, the body of wheel 1.

Figure 3:
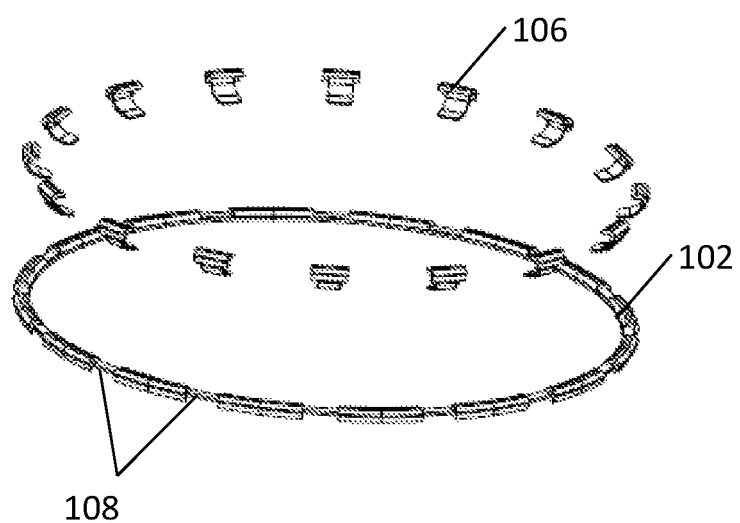
FIG. 3 depicts an alternate embodiment of the surface shield 100 of FIG. 2 in accordance with an embodiment of the present invention.

The first structure 102 may include a plurality of clamps 106, preferably removable clamps 106 (shown in FIG. 3). Each clamp 106 may be externally fixed to the first structure 102 via a fixing mechanism. The fixing mechanism may include, without limitation, an adhesive, a clip or a snap fit arrangement.

As represented in FIG. 3, the first structure 102 includes a plurality of slots 108 with dimensions corresponding to the dimensions of the clamps 106. The clamps 106 may be snap-fitted in the slots 108 provided on the first structure 102. The slots 108 extend at least partially from the outer surface to the inner surface of the first loop 102.

The process of constructing such an assembly is less cost intensive as the cost of utilizing complex tools is significantly reduced. Moreover, the first structure 102 and clamps 106 are transported in an unassembled state which reduces chances of damage incurred during transportation of the surface shield 100. Further, such an arrangement is a customized assembly as it allows a user to select the first structure 102 and clamps 106 separately based upon user's requirement and choice. Also, in case, any clamp(s) 106 is damaged while utilization of the surface shield, the damaged clamp 106 may be easily replaced eliminating the need to replace the entire surface shield 100.

Alternately, the clamps 106 may be permanently associated with the first structure 102 as an integral assembly via for example, a moulding technique. In an embodiment of the present invention, the first structure 102 is made of polypropylene while clamps 106 are made of nylon via injection moulding.

The clamps 106 may be disposed along the circumference of the first structure 102 and evenly spaced apart at a predetermined distance. Alternatively, the clamps 106 may be placed at irregular intervals along the body of the first structure 102. In yet another embodiment, the clamps 106 have an alternating arrangement between the outer circumference and the inner circumference of the first structure 102.

The clamps 106 may be made from the same material as that of the first structure 102 or have different material of construction. The clamps 106 may be made of any sturdy material known in the art, for example, steel, aluminum, etc. The sturdy material of the clamps 106 confers strength to the surface shield 100 and eliminates any chance of detachment of the surface shield 100 while the vehicle is in motion.

The shape of the clamp 106 may be any curved shape known in the art. For example, the clamp 106 is a J-shaped entity. The clamp 106 may include a bar 106a and a curve 106b as shown in FIG. 4. The bar 106a may be in contact with the first structure 102 while the curve 106b may be associated with the bar 106a at one end and the other end may be free. Alternately, rather than clamps 106, a continuous curved structure may be provided.

The clamps 106 may include one or more spikes 106c (shown in FIG. 4) for engaging the surface shield 100 to the space between a tire and the rim of wheel 1. However, any other engaging means which solves the said purpose is also within the scope of the present invention. In an embodiment, there are three rows of spikes 106c spaced at a predetermined distance, first two rows with two spikes 106c each and the last row with one spike 106c. The spikes 106c may be an embossed surface of any kind known in the art. The spikes 106c may be disposed on the curve of the clamp 106. In case of multiple spikes 106c, all spikes 106c may be of one kind or different kinds. The presence of spikes 106c may promote efficient attachment and detachment of the surface shield 100 to the wheel(s) 1 of the vehicle.

The foregoing description of preferred embodiments of the present disclosure provides illustration and description, but is not intended to be exhaustive or to limit the disclosure to the precise form disclosed. Modifications and variations are possible in light of the above teachings or may be acquired from practice of the disclosure. For example, the first structure 102 may be detachably associated with a disc. The disc functions to cover one or more spokes of the wheel 1. The disc may have dimensions that complement the dimensions of the cavity 10 of the first structure 102. The disc may be made from the same material as that of the first structure 102 or have different material of construction. The inner circumference of the first structure 102 may include a fixing means to detachably attach the disc. For example, the disc is snap fitted to the inner circumference of the first structure 102.

In an alternate embodiment, the disc is replaced with sticks which complement the spoke of the wheel. Such structures which cover the cavity 10 of the first structure 102 may aid in providing support to the first structure 102 and also enhance the visual appeal of the vehicle.

No element, act, or instruction used in the description of the present disclosure should be construed as critical or essential to the invention unless explicitly described as such. Also, as used herein, the article "a" is intended to include one or more items. Where only one item is intended, the term "one" or similar language is used.

The invention claimed is:

1. A surface shield comprising:
    a first structure including an inner surface and an outer surface, the outer surface comprising a plurality of slots, the inner surface is in contact with an underlying surface to be protected, the outer surface includes a channel, the first structure comprising one of a single-part structure or a multi-part structure;
    a second structure seated in the channel of the first structure via a snap fit arrangement for imparting strength to the first structure; and
    a plurality of clamps removably coupled to the slots of the first structure, each clamp coupled to a corresponding slot of the first structure.

2. The surface shield as claimed in claim 1, wherein the channel extends for at least a portion of circumferential length of the first structure.

3. The surface shield as claimed in claim 1, wherein the second structure comprises a solid ring.

4. The surface shield as claimed in claim 1, wherein the second structure is dimensionally smaller than the first structure.

5. The surface shield as claimed in claim 1, wherein the slots extend at least partially from the outer surface to the inner surface.

6. The surface shield as claimed in claim 1, wherein each clamp includes at least one spike.

7. The surface shield as claimed in claim 1, wherein the clamps are J-shaped.

* * * * *